United States Patent [19]

Mathews

[11] 4,395,866
[45] Aug. 2, 1983

[54] HAY CONDITIONER

[76] Inventor: Bernard C. Mathews, 8606 Rte. 176, Crystal Lake, Ill. 60014

[21] Appl. No.: 322,480

[22] Filed: Nov. 18, 1981

[51] Int. Cl.³ ............................................. A01D 55/26
[52] U.S. Cl. ...................................... 56/16.4; 56/192; 56/DIG. 1; 171/58
[58] Field of Search ................. 56/192, DIG. 1, 13.6, 56/14.3, 14.2, 16.4; 171/58

[56] References Cited

U.S. PATENT DOCUMENTS

| | | | |
|---|---|---|---|
| 2,610,633 | 9/1952 | Jozwik | 56/DIG. 1 |
| 2,924,283 | 2/1960 | Macphee | 171/58 |
| 3,437,152 | 4/1969 | Barrentine | 171/58 |
| 3,672,136 | 6/1972 | Peacock et al. | 56/DIG. 1 |
| 3,769,782 | 11/1973 | Cler | 56/51 |
| 4,026,092 | 5/1977 | Wehde | 171/58 |
| 4,160,356 | 7/1979 | Mathews | 56/192 |
| 4,177,625 | 12/1979 | Knight et al. | 56/13.6 |
| 4,292,789 | 10/1981 | Mathews | 56/12.7 |
| 4,292,790 | 10/1981 | Mathews | 56/13.6 |

FOREIGN PATENT DOCUMENTS 2816144  10/1979  Fed. Rep. of Germany ....... 56/13.6

Primary Examiner—Jay N. Eskovitz

[57] ABSTRACT

A cooperative roll hay conditioner in which the rolls are pneumatic tired wheels and one of the pneumatic tired wheels is snuggly surrounded by a steel cage to effect the crimping of harvested hay as the hay passes between the cooperative pneumatic tired wheels.

12 Claims, 7 Drawing Figures

HAY CONDITIONER

BACKGROUND OF THE INVENTION

1. Field of the Invention

The present invention is concerned with the conditioning of hay immediately after its harvesting and just before it is deposited in a windrow for drying and curing. The environment of the hay conditioner in the present instance is with a drum type mower such as shown in my own prior U.S. Pat. Nos. 4,160,356, 4,292,789, and 4,292,790. This conditioning constitutes a crimping of the hay stalks at spaced apart positions along its length. Such crimping of the stalks enhances the retention of nutrients in the hay when it dries. Usually the conditioners of the past have comprised a pair of cooperative rolls through which the harvested hay is passed. The surface conformations of these rolls are used to effect the crimping of the hay stalks. The present invention employs cooperative pneumatic tired wheels as the hay conditioner rolls. One of these pneumatic tired wheels is provided with a steel cage positioned over its tread so that the rods of the cage engage the tread of the cooperative tire to cause a crimping of hay as it passes through the engaging surfaces of the tires.

2. Description of the Prior Art

A search discloses that there are numerous prior patents which employ cooperative rollers to effect hay conditioning. Two of those prior patents of which we are aware embody the hay conditioner on drum type mowers. These are the U.S. Pat. No. 4,177,625 to Knight et al and the West German Pat. No. DT 2816-144. The Knight et al patent best shows the cooperative hay conditioning rolls 120 and 121 in FIGS. 1 and 4. The rolls 120 and 121 are equipped with intermeshing spiral grooves to effect the desired crimping of the hay.

The West German patent employs a pair of cooperative hay conditioning rolls 76 and 77 supported behind a drum type mowing unit as best shown in FIG. 3.

We are not aware of any prior hay conditioners which employ pneumatic tired wheels as hay conditioning rollers We did, however, find that cooperative pneumatic tired wheels have been used for other purposes. For example, the U.S. Pat. No. 3,769,782 to Cler employs a pair of cleated pneumatic tires as a corn detasseler. The engaging tires are used to nip and remove corn tassels.

The U.S. Pat. No. 2,924,283 to Macphee employs a pair of pneumatic tired wheels to pull cotton plants out of the ground.

The U.S. Pat. No. 3,437,152 to Barrentine employs a pair of pneumatic tired wheels having their peripheries in pressure contact with each other to form a nip to pull stalks.

However, no one to our knowledge has previously enclosed one of a cooperative pair of pneumatic tired wheels with a steel cage for any purpose.

SUMMARY OF THE INVENTION

A principal object of this invention is to provide a novel hay conditioner with cooperative hay crimping rolls.

An important object of this invention is to provide a novel hay conditioner in association with a drum type mower.

Another important object of this invention is to provide novel hay conditioner cooperative rolls disposed on an incline immediately behind a drum type mower and arranged to deposit the conditioned hay in a windrow behind the mower-conditioner.

Still another important object of this invention is to provide novel cooperative hay conditioning rolls comprised of pneumatic tired wheels.

Another and still further important object of this invention is to provide a novel steel cage for one of a pair of cooperative pneumatic tired wheels used to condition hay.

An important object of this invention is to provide a novel steel cage for enclosing one of a pair of cooperative pneumatic tired wheels and the cage comprising a pair of spaced apart rings flanking the sides of the pneumatic tire and the rings joined at relatively regular intervals with bars passing over the tread portion of the tire to thereby cooperate with the tread portion of the uncaged tire to effect a crimping of hay therebetween.

Other and further important objects and advantages will become apparent from the disclosures in the accompanying drawings and following specification.

IN THE DRAWINGS

AS SHOWN IN THE DRAWINGS

Figure 1:
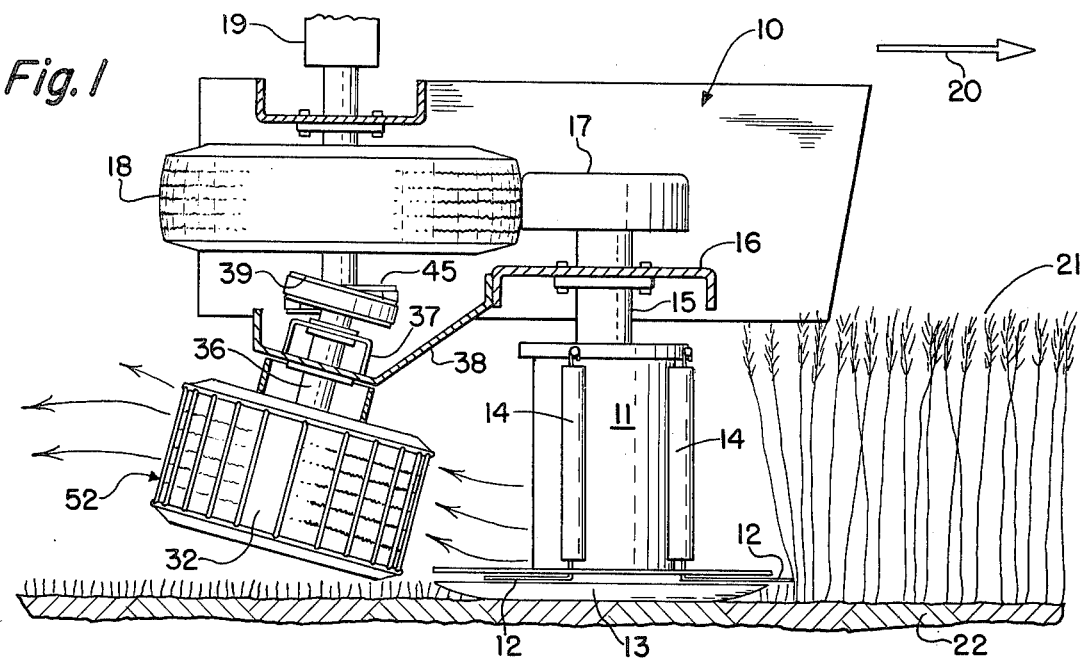
FIG. 1 is a longitudinal sectional view of the combination mower-conditioner of this invention and taken on the line 1—1 of FIG. 2.

The reference numeral 10 indicates generally a frame structure for the combination mower-conditioner of this invention. As best shown in FIG. 1 a mower drum 11 is equipped with radial cutters 12 which act to cut hay or grasses as shown and described in my prior U.S. Pat. Nos. 4,292,789 and 4,292,790. Beneath the cutters is a ground engaging dish member 13 which rides over the ground in the operation of the mower. The drum 11 has radial, vertically disposed flutes 14 which act as paddles to deliver cut hay rearwardly.

A drum shaft 15 is journally supported at 16 in a portion of the frame 10. A steel drum or rotor 17 is provided at the top of the mower drum 11 and is used to rotatably drive the motor drum 11. A pneumatic tired wheel 18 frictionally engages the rotor 17 and thus imparts drive to the mower drum as depicted in my prior U.S. Pat. No. 4,160,356.

Drive from a pulling tractor (not shown) is delivered to a gear box 19 which in turn causes rotation of the pneumatic wheel 18. An arrow 20 shows the direction of travel of the mower-conditioner of this invention. The standing hay to be cut is represented by the numeral 21. The ground is shown at 22 over which the implement rides.

Figure 2:
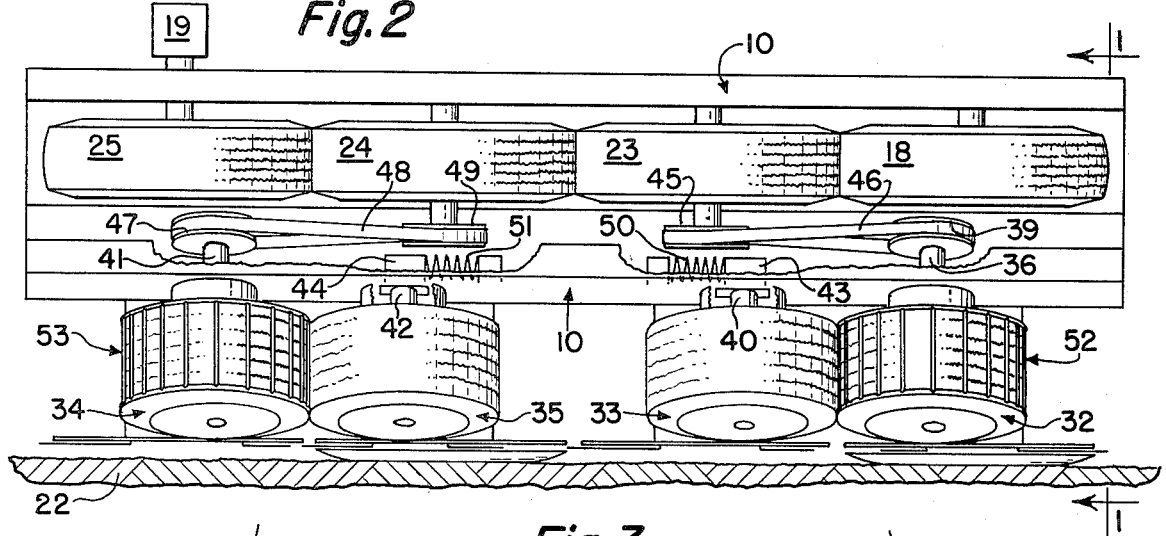
FIG. 2 is a rear elevational view of the mower-conditioner of this invention.
Figure 3:
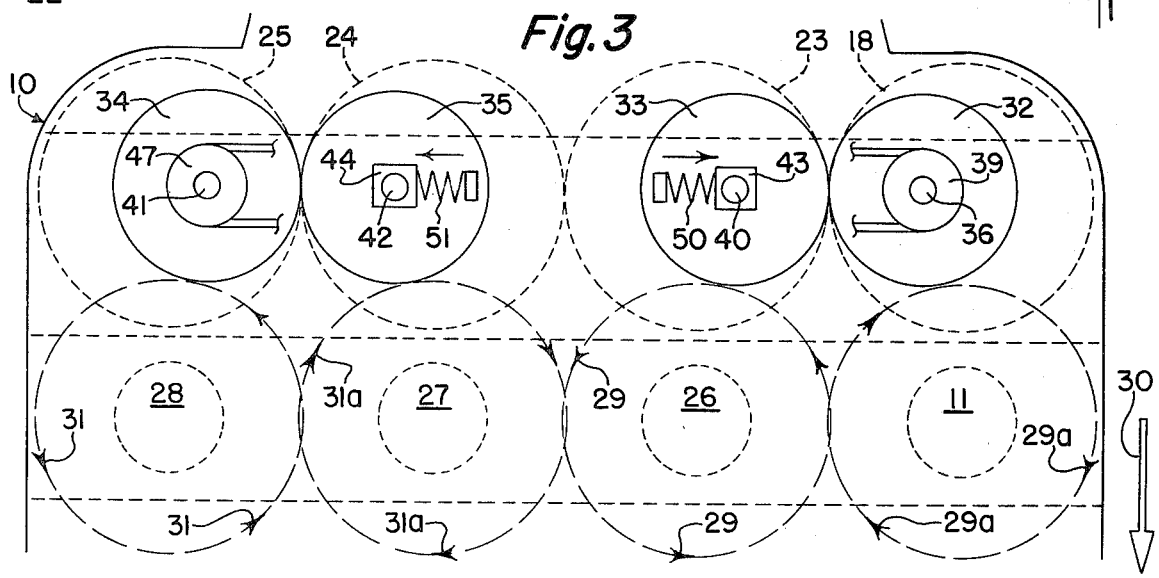
FIG. 3 is a diagrammatic top plan view of the device of FIGS. 1 and 2.

The mower depicted has four pneumatic tired drive members as best shown in FIG. 2. The pneumatic tire 18 is frictionally engaged by a pneumatic tired wheel 23 and it in turn by pneumatic tire 24 and finally pneumatic tire 25. Each of the pneumatic tires is associated with a mowing drum so there are four such mowing drums 11, 26, 27 and 28 as best shown in FIG. 3. The drums 11 and 26 rotate inwardly toward each other as shown by the arrows 29 and 29a causing the cut hay to be paddled rearwardly therebetween. Again the direction of the mower-conditioner of this invention travels in the direction of the arrow 30. Similarly the drums 27 and 28 rotate as a pair rearwardly in the direction of the arrows 31 and 31a. Thus there are two windrows formed with a four drum mower—each pair of drums cooperating to deliver cut hay into generally confined paths.

It is behind these mowing drums that the hay conditioners of this invention are mounted to condition the hay from the mower portion of the combination implement. The hay conditioners each comprise a pair of cooperating pneumatic tired wheels 32 and 33 and 34 and 35. As best shown in FIG. 1 the wheel 32 is provided with an axle or shaft 36 which is journally mounted in a bearing 37 carried on a frame portion 38. This portion 38 is joined to the frame portion 16 and forms a shield beneath which harvested hay is passed to the hay conditioners. A pulley 39 is fixed to the wheel axle 36. The pairs of cooperative pneumatic tired wheels 32 and 33 and 34 and 35 are slightly inclined upwardly and rearwardly so that the axle 36 of the wheel 32 is inclined downwardly and rearwardly and thus the pulley carried thereon is somewhat canted. Each of the cooperative pairs of conditioning wheels is provided with an axle about which it has rotation. These axles are shown at 40, 41 and 42 respectively for the wheels 33, 34 and 35. The wheels 33 and 35 are merely journally supported in bearing boxes 43 and 44 carried on the frame structure 10. The pneumatic tired wheel 23 is provided with a belt pulley 45 on its underside. A belt 46 is adapted to join the pulley 45 and the canted pulley 39 and thereby imparts drive from the drive wheel 23 to the canted pulley 39 which in turn rotatably drives the outermost cooperative hay conditioning wheel 32. The frictional engagement of the wheels 32 and 33 cause the driven wheel 32 to rotate the wheel 33. A similar construction is provided for the pair of conditioning wheels or rotors 34 and 35. The axle 41 of the other outermost wheel 34 is provided with a canted pulley 47 at its upper end and is driven by a belt 48 which is attached to a pulley 49 on the underside of the drive wheel 24. Thus the outermost wheels of the two pairs of cooperative pneumatic tired wheels are rotatably driven and their cooperative wheels are driven merely by frictional engagement.

A compression spring 50 is associated with the bearing box 43 and normally urges the axle 40 in a direction toward the cooperative pneumatic tired wheel 32. Similarly a compression spring 51 in the bearing box 44 normally urges the shaft 42 toward the cooperative pneumatic tired wheel 34. These springs 50 and 51 allow the pneumatic tired hay conditioning wheels 33 and 35 to shift away from their cooperative pneumatic tired wheels 32 and 34 respectively when rocks or other foreign matter are forced between the bights of the cooperative wheels. This prevents damage to the conditioning rolls.

A steel cage 52 is provided around the pneumatic tired wheel 32 and a similar steel cage 53 is provided around the other outermost pneumatic wheel 34. Thus each pair of hay conditioning wheels is equipped with one steel cage. It is these steel cages that cause the hay passing between the bights of the cooperative wheels that cause the hay to be crimped and thus conditioned for proper drying for maximum food retention in the hay when the hay is dried.

Figure 4:
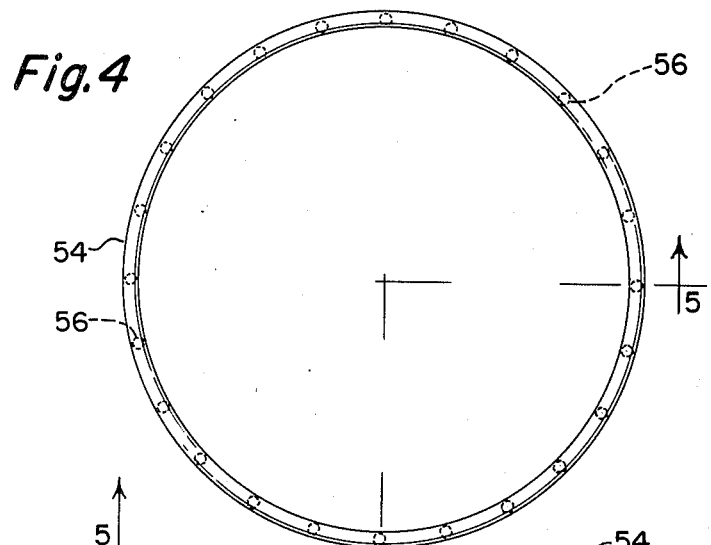
FIG. 4 is a top plan view of one form of steel tire cage.
Figure 5:
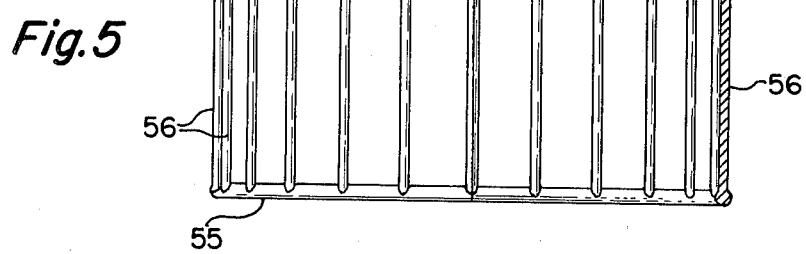
FIG. 5 is a half sectional view of the steel cage as taken on the line 5—5 of FIG. 4.

FIGS. 4 and 5 show one form of steel cage construction. This cage includes spaced apart solid steel side rings 54 and 55 which are adapted to flank the sides of the pneumatic tires. These solid rings are joined by a plurality of generally uniformly spaced rods 56 which extend around the tire. The rods 56 pass over the tread face of the tire and are joined at their ends by welding or other means of attachment to the solid side rings 54 and 55. When the pneumatic tired wheels adapted to carry the cages are inflated the cages are fixedly held to the wheel during its hay conditioning operation. The rods 56 engage and press against the rubber tread of the cooperative uncaged tire and thus act to pinch the hay passed therebetween.

Figure 6:
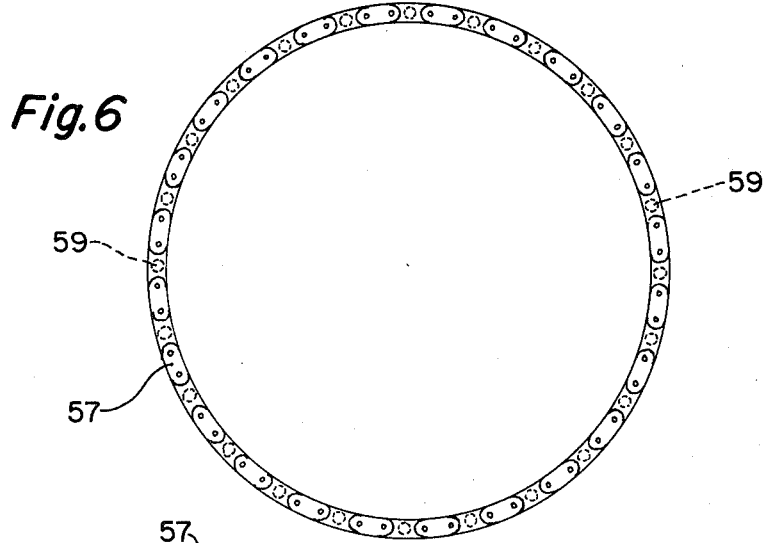
FIG. 6 is a top plan view of another form of tire cage.
Figure 7:
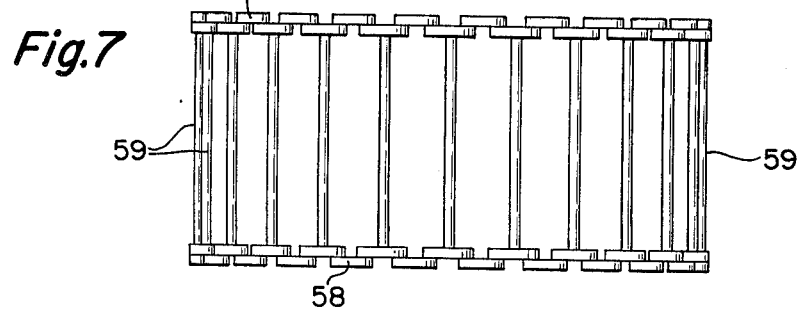
FIG. 7 is a side elevational view of the cage of FIG. 6.

The steel cage of FIGS. 6 and 7 differs from the cage of FIGS. 4 and 5 in that the spaced side rings 57 and 58 comprise chain links rather than solid steel rings. Rods 59 comparable to the rods 56 of the cage of FIGS. 4 and 5 are joined preferably by welding of these chain link side rings. Both forms of cages work equally well but the chain link rings make it easier to service by a user in the event of breakage of the side rings.

It should be understood the cages used to encompass one of the pneumatic tires of the pairs of tires may vary in their construction. It is only essential that some steel members be disposed over the tread face of one tire to cooperatively engage the rubber tread of the cooperative tire. This of course is necessary to effect the crimping of the hay stalks passing between the cooperative rolls.

I am aware that numerous details of construction may be varied throughout a wide range without departing from the principles disclosed herein and I therefore do not propose limiting the claims granted hereon otherwise than as necessitated by the prior art.

What is claimed is:

1. A hay conditioner comprising a pair of cooperative rolls between which harvested hay is passed, both of said rolls comprising pneumatic tired wheels, one of said pneumatic tired wheels having a steel cage formed therearound, said steel cage having spaced apart circular steel rings disposed at opposite sides of the pneumatic tire, a plurality of parallel steel rods at generally regular intervals passing over the tread face of the pneumatic tire and welded at their ends to the spaced steel rings, whereby when the pneumatic tires are fully inflated the steel rods of the cage on the one tire press into the uncaged cooperative tire to cause a crimping of the hay stalks as they are fed between these cooperative rolls.

2. A device as set forth in claim 1 in which the caged pneumatic tire is rotatably driven.

3. A device as set forth in claim 1 in which the uncaged pneumatic tired wheel is spring urged against the caged pneumatic tired wheel whereby when rocks or other foreign matter enter the space between the tires the uncaged tire may yield outwardly.

4. A hay conditioning unit for a drum type mower in which a generally vertically disposed pair of cooperative hay cutting drums deliver cut hay rearwardly at the juncture thereof, the hay conditioning unit comprising a pair of cooperatively engaging pneumatic tired wheels set at an incline behind the mower, and means on the cooperatively engaging surfaces of the pneumatic tired wheels adapted to directly receive and cause intermittent crimping of the hay for effecting the conditioning thereof.

5. A device as set forth in claim 4 in which the means on one of said pneumatic tired wheels comprises a steel cage therearound to cause a crimping of the hay as it passes between the cooperatively engaging pneumatic tired wheels.

6. A hay conditioner comprising a pair of cooperative rolls between which harvested hay is passed, both of said rolls comprising pneumatic tired wheels, one of said pneumatic tired wheels having a steel cage formed therearound, whereby when the pneumatic tires are fully inflated the steel cage on the one tire presses into the uncaged cooperative tire to cause a crimping of the hay stalks as they are fed between these cooperative rolls.

7. A hay conditioner comprising a pair of cooperative rolls between which harvested hay is passed, both of said rolls comprising pneumatic tired wheels, one of said pneumatic tired wheels having a steel cage formed therearound, said steel cage having spaced apart circular ring members disposed at opposite sides of the pneumatic tire, a plurality of parallel steel rods at generally regular intervals passing over the tread face of the pneumatic tire, whereby when the pneumatic tires are fully inflated the steel rods of the cage on the one tire press into the uncaged cooperative tire to cause a crimping of the hay stalks as they are fed between these cooperative rolls.

8. A device as set forth in claim 7 in which the ring members comprise chain link elements.

9. A hay conditioning unit for a drum type mower in which a generally vertically disposed pair of cooperative hay cutting drums deliver cut hay rearwardly at the juncture thereof, the hay conditioning unit comprising a pair of cooperatively engaging pneumatic tired wheels behind the mower, and means on the cooperatively engaging surfaces of the pneumatic tired wheels adapted to directly receive and cause intermittent crimping of the cut hay for effecting the conditioning thereof.

10. A device as set forth in claim 9 in which the means on one of said pneumatic tired wheels comprises a steel cage therearound to cause a crimping of the hay as it passes between the cooperatively engaging pneumatic tired wheels.

11. A hay conditioner comprising a pair of cooperative rolls between which harvested hay is passed, both of said rolls comprising rubber tired wheels, one of said rubber tired wheels having a steel cage formed therearound, whereby the steel cage on the one rubber tire presses into the uncaged cooperative rubber tire to cause a crimping of the hay stalks.

12. A device as set forth in claim 11 in which the steel cage comprises spaced apart circular steel rings disposed at opposite sides of the rubber tire, a plurality of parallel steel rods at generally regular intervals passing over the tread face of the rubber tire and welded at their ends to the spaced steel rings.

* * * * *